(12) United States Patent
Pratt et al.

(10) Patent No.: US 6,664,852 B2
(45) Date of Patent: Dec. 16, 2003

(54) APPARATUS AND METHOD FOR DIGITAL CONTROL SYSTEMS

(75) Inventors: Patrick Joseph Pratt, Mallow (IE); Dale G Schwent, Schaumburg, IL (US); Thomas D Nagode, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/084,988

(22) Filed: Feb. 28, 2002

(65) Prior Publication Data

US 2003/0160656 A1 Aug. 28, 2003

(51) Int. Cl.$^7$ ............................. H03F 1/26; H04L 25/49
(52) U.S. Cl. .................................. 330/149; 375/297
(58) Field of Search .................... 330/149; 375/297; 455/63

(56) References Cited

U.S. PATENT DOCUMENTS

| | | | |
|---|---|---|---|
| 5,903,823 A | * 5/1999 | Moriyama et al. | 455/126 |
| 6,054,894 A | * 4/2000 | Wright et al. | 330/149 |
| 6,418,173 B1 | * 7/2002 | Matsuoka et al. | 375/297 |
| 6,462,617 B1 | * 10/2002 | Kim | 330/149 |

FOREIGN PATENT DOCUMENTS

WO    WO 00/77925 A1    12/2000

OTHER PUBLICATIONS

Barbara Baggini et al., "Power Controller for Mobile Application", 1999 IEEE, pp. 588–591.

Hassan O. Elwan et al., "Digitally Programmable Decibel–Linear CMOS VGA for Low–Power Mixed–Signal Applications", May 2000 IEEE Transactions On Circuits And Systems—II: Analog and Digital Signal Processing, vol. 47, No, 5, pp. 388–398.

H.O. Elwan et al., "Digitally controlled CMOS current follower for low voltage low power applications", Electronics Letters, 26$^{th}$ Nov. 1998, vol. 34, No. 24, pp. 2297–2298.

Stephen L. Wong et al., "A 2.7–5.5 V, 0.2–1 W BiCMOS RF Driver Amplifier IC with Closed–Loop Power Control and Biasing Functions", Dec. 1998 IEEE Journal of Solid–State Ciruits, vol. 33, No. 12, pp. 2259–2264.

* cited by examiner

*Primary Examiner*—Robert Pascal
*Assistant Examiner*—Khanh Van Nguyen

(57) ABSTRACT

An apparatus and method for controlling an output (50) of a digital system (10) comprising, for example, an output of a power amplifier (24) to minimise or neutralise nonlinearities such as limit cycles. The digital system comprises a nonlinearity means or limit cycle suppressor (16) to counter the limit cycle effect by intentionally introducing a second nonlinearity into the system (10) to suppress the limit cycle effect in the digital system (10).

8 Claims, 3 Drawing Sheets

APPARATUS AND METHOD FOR DIGITAL CONTROL SYSTEMS

FIELD OF THE INVENTION

The present invention relates generally to an apparatus and method for digital control systems. More specifically, the invention relates to an apparatus and method for digital control systems, used for example in digitally controlled power amplifier systems, digitally controlled motor control systems, and the like, to minimise and suppress limit cycle behaviour in digital control systems.

BACKGROUND OF THE INVENTION

Digital control systems are used in a variety of applications and systems such as power amplifier control (PAC) systems, motor control systems and the like. Digital control systems, unlike analogue control systems, can suffer from various problems fundamentally arising from the nonlinearity nature of digital dynamics. Such a problem is limit cycles.

Limit cycling may be caused by the inherent nonlinearity of the system typically introduced by quantisation process performed in digital-to-analogue converters (DAC). Another source of limit cycling in PAC systems occurs when the resolution of the power reference is greater than that of the analogue-to-digital (ADC) resolution. DAC quantisation nonlinearities in closed loop digital control systems used in, for example, radio frequency power amplifier regulation, can result in a periodic behaviour of the power level during the modulation phase. The periodic or cyclic behaviour if unchecked may be so severe to cause the system to fail power-time and the switching and modulation output radio-frequency spectrum specifications, for example, European Telecommunications Standardization Institute (ETSI) 11.10 and 05.05 for Global System for Mobile Telecommunications (GSM) standard.

As greater precision control of digital control systems is required, for example in the precision control of transmitter power amplifier output to meet and comply with Time Division Multiple Access (TDMA) systems such as GSM, there is a need for an apparatus and method to minimise and suppress limit cycle behaviour to meet standard requirements in digital control systems.

BRIEF DESCRIPTION OF THE DRAWINGS

Embodiments of the invention will now be more fully described, by example, with reference to the drawings, of which.

DESCRIPTION OF THE PREFERRED EMBODIMENTS

Unlike analog control systems, digital control systems can suffer from various problems, such as limit cycling, which arise from the nonlinear nature of digital dynamics. Limit cycles in digital systems such as digital control systems are a self-sustained periodic motion of an autonomous nonlinear system. The cyclic behaviour of a limit cycle in a system such as a digital control system, for example, power amplifier and multi-mode power amplifier control can ultimately cause a system to fail specification requirements. This nonlinearity is introduced into digital systems from a variety of sources, for instance, in digital control systems the nonlinearity is introduced by the digital to analog converter (DAC) quantisation process.

Figure 1:
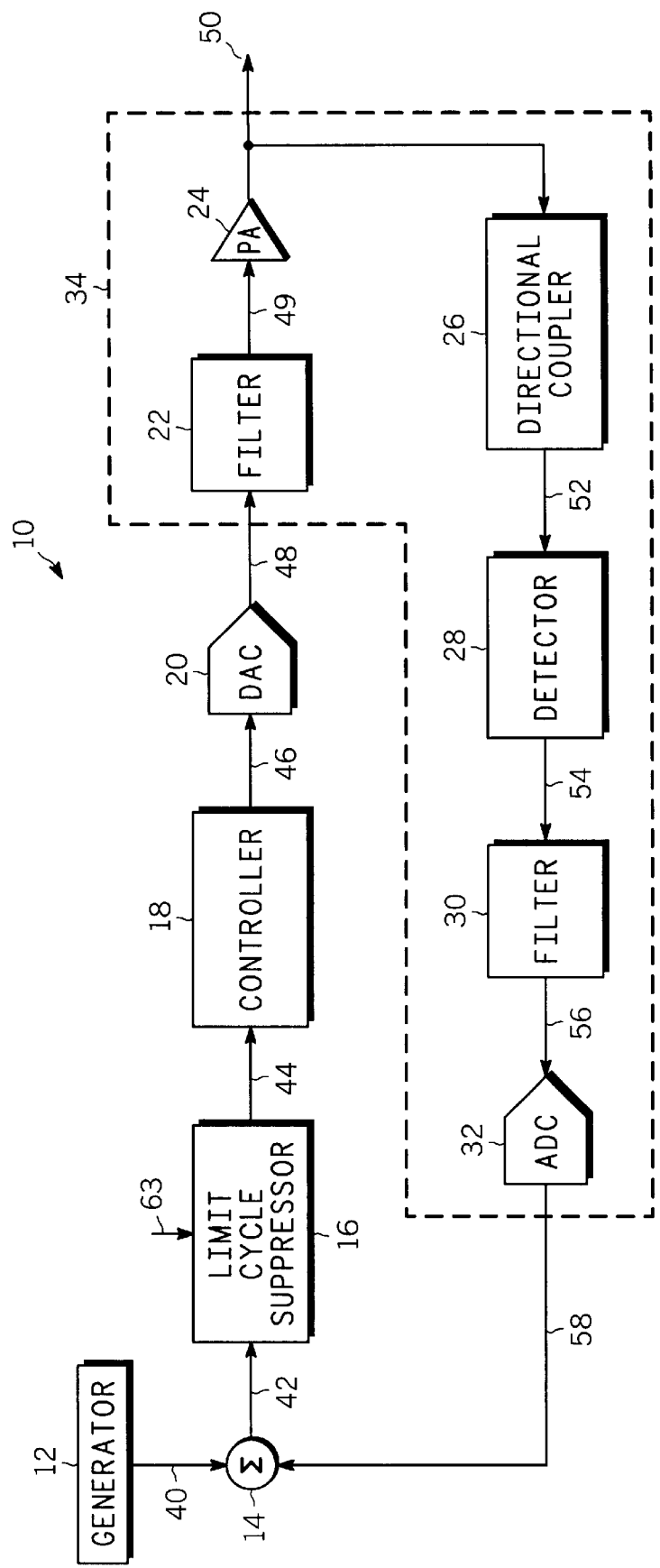
FIG. 1 shows a closed loop digital control system and method according to an embodiment of the invention.

FIG. 1 depicts a closed loop digital control system 10 and method according to an embodiment of the invention. The closed loop digital control system 10 may comprise a waveform generator 12 for supplying a reference power value signal r(n) 40 with controller error e(n) to a controller 18. The controller may be for example a two-term controller, i.e. proportional and integral (PI) controller, whose proportional gain, $k_p$, and integral gain, $k_i$, represent PROP-gain $g_0$ and ERR-gain $g_1$, respectively, by the equation $(g_0+g_1z^{-1})/(1-z^{-1})$, where $g_o=k_p+k_i$ and $g_1=-k_p$. The controller 18 provides a control or bias signal u(n) 46 at controller output to DAC 20 having linear action represented by $(1-z^{-1})/s$, which introduces quantisation nonlinearities to the system 10 by quantisation process represented by unfiltered control or bias voltage signal û(t) 48 to power amplifier subsystem 34. Power amplifier subsystem 34 provides a power amplifier output power signal $P_o$ 50 that is feedback and subtracted from negative feedback terminal 14. Power detector 28 measures the power level 50. It will be appreciated that although a power amplifier subsystem 34 is shown, other configurations may include any digital loop for example and not limited to digital motor control, digital process control including processes such as temperature, fluid level, fluid flow etc., and digital engine management units such as advanced braking and climate control.

In FIG. 1 the power amplifier subsystem 34 is shown having a filtered control or bias voltage signal u(t) 49 from filter 22, which is supplied to power amplifier 24. The power amplifier output power signal $P_o$ 50 is feedback through directional coupler 26 having coupler gain $k_c$ and providing directional coupler output power signal $P_c$ 52, power detector 28 having effective detector gain $k_d$ providing a voltage output signal $v_d(t)$ 54, anti-aliasing filter 30 providing a filtered voltage output signal $v_d(t)$ 56, and analog to digital converter (ADC) 32 providing resulting digital code signal $v_d(n)$ 58 that is subtracted at negative feedback terminal 14 from the reference power value signal 40.

The digital control system 10 for controlling the output of the power amplifier 24 shown in FIG. 1 also comprises intentional nonlinearity means N(e) 16. As discussed above, a limit cycle is always present in digital systems, and in this embodiment the presence of a limit cycle is treated as problematic. To counter the limit cycle, a nonlinearity is intentionally introduced into the system 10 to suppress the limit cycle. The intentional nonlinearity is chosen to neutralises the inverse gain effect of the DAC 20.

To further explain this inverse gain effect of the DAC 20, a technique for nonlinear control theory known as Describing Function Analysis is employed. The nonlinear effect of DAC 20 introduces a code dependent gain. In use, the DAC 20 has a small signal gain arising from a quantisation or truncation process from, for example, 22 bits to 10 bits. This small signal gain is different from its large signal gain and fundamentally, as the input amplitude or input changing code received from control or bias signal u(n) 46 reduces, the effective gain of the DAC 20 increases. For example, in this embodiment, in the limit the small signal gain tends to infinity, while the large signal gain tends towards the ratio of the maximum DAC output voltage to the maximum input code. Consequently, as the loop settles and the controller 18 output control or bias signal u(n) 46 tends towards the steady state, the code changes applied to the DAC 20 reduce causing the effective gain of DAC 20 to increase. However, an infinite gain within the system loop 10 would ultimately lead to instability with the controller 18 output control or bias signal u(n) 46 changes now increasing. Accordingly, the effective gain of DAC 20 would reduce back towards its large signal value. A reducing gain would return stability to the loop and allow it to settle towards the steady state. This cycle repeats in the system, such that neither the stable nor unstable operation persists. Thus, a stable steady oscillatory motion known as a limit cycle governs the behaviour of the loop, with the amplitude of the DAC 20 input code cycle being, for example, 1 least significant bit.

Figure 2:
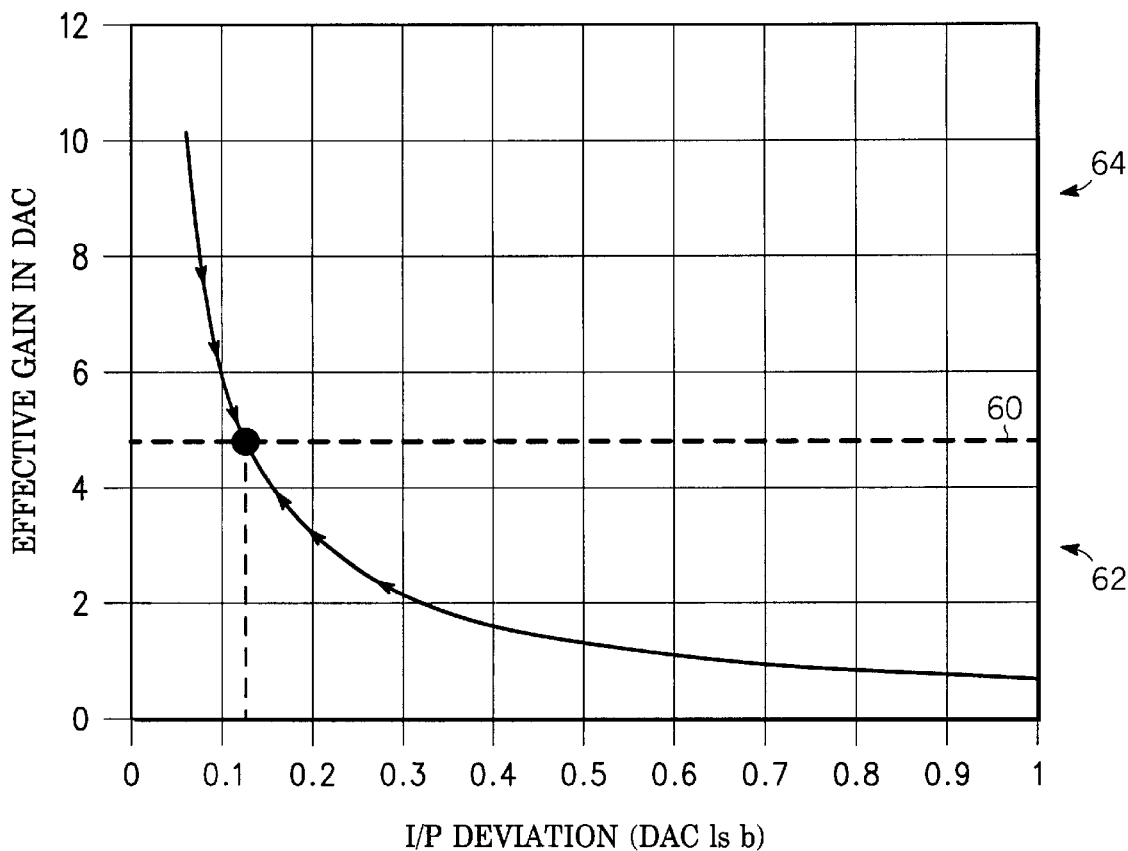
FIG. 2 shows a graph plot of the deviation in input of the digital to analog converter in least significant bits verses the effective gain in digital to analog converter in accordance with an embodiment of the invention.
Figure 3:
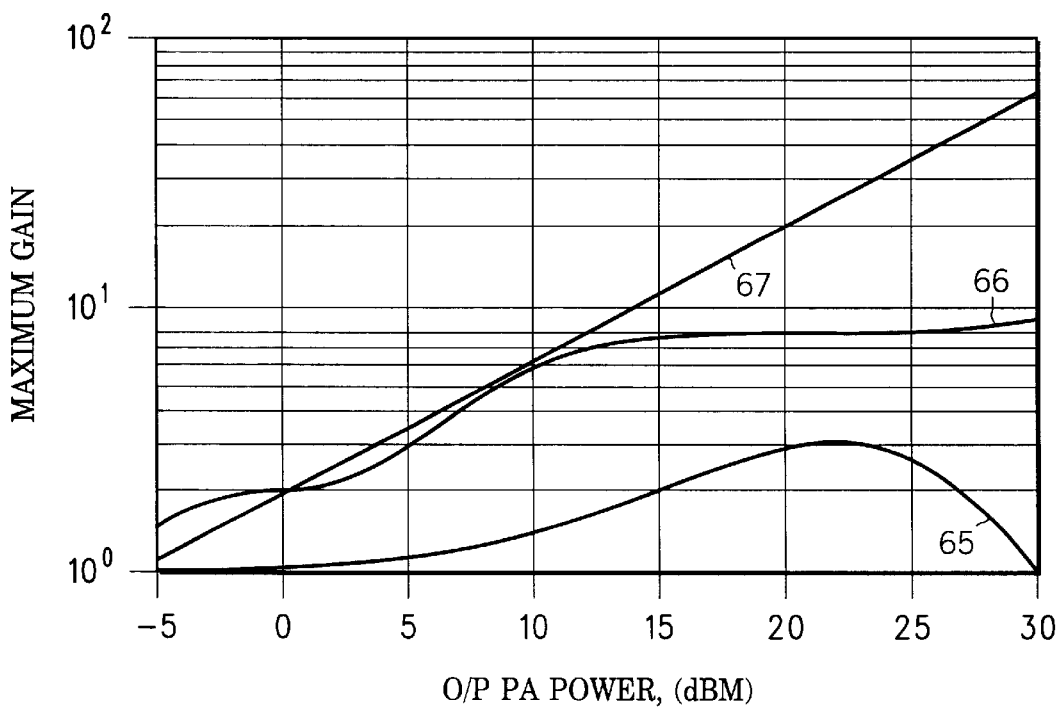
FIG. 3 shows a graph plot of the power amplifier control gain limits according to an embodiment of the invention.

From FIG. 2 it can be shown that the effective gain of the DAC 20 is equivalent to the linear gain, which would make the loop marginally stable, i.e. the ultimate gain $k_u$ 60. FIG. 2 shows a graph plot of the input deviation of the DAC 20 in least significant bit (lsb) verses the effective gain of the DAC 20, where there is an unstable region 64 above ultimate gain 60, and a stable region 62 below ultimate gain 60. Where 60 interests the gain curve 63 the corresponding x-axis around 0.125, for this particular example, determines the amplitude of the DAC input code limit cycle. During cycling, the input code 46 to the DAC 20 will be a sinusoid having an amplitude as indicated on the x axis. It should be noted that the actual numerical values may vary and the ones shown are examples and are for merely illustrative purposes. The critical dynamic is that the effective gain of the nonlinearity tends to infinity as the input deviation reduces, exceeding the ultimate gain and thus producing a range of unstable gains 64, an ultimate gain 60, and a range of stable gains 62. The frequency of cycling is known as the ultimate frequency and is simply the frequency at which the loop has a phase response of −180°. It should be noted, however, the system specifications may still be met even with the presence of a limit cycle in the system 10. When the DAC 20 input signal, i.e., controller 18 output control or bias voltage signal u(t) 49, cycles with an amplitude, for example, 1 lsb in the steady state, the amplitude of the cycle at the power amplifier 24 output 50 will depend on the gain between the bias or control voltage and the power amplifier output voltage. If this gain is kept sufficiently low, for example which depends on other loop parameters, such as power settings, etc., then specification requirements may still be met, for example, European Telecommunications Standardization Institute (ETSI) 05.05 and 11.10 for Global System for Mobile Telecommunications (GSM) standard. That is, a limit cycle may still be present at the power amplifier 24 output 50, the amplitude of the output signal may be sufficiently low enough that its effect on the power-time and the switching and modulation output radio frequency spectrum is not problematic to the system 10 such that the specification requirements are still met. FIG. 3 shows, for example, if the power level is 10 dBm then the gain must be less than 6 FIG. 3 is a plot of the maximum power amplifier control gain such that limit cycles may be present but not cause a problem, such as failing to meet system specifications and requirements, for a specific control loop, such as power time specification 67 and modulation output radio frequency spectrum 66. The nominal gain 65 is the power amplifier control gain slope of controller output control or bias voltage signal u(t) 49 to the filtered voltage output signal $v_d(t)$ 54. It will be appreciated that the results plotted in FIG. 3 are results for the embodiment of the control loop discussed, and any change in control loop set up would have different results. Furthermore, in addition to the specific example, the upper limits are determined for the particular specification as prescribed in ETSI 05.05 and 11.10. However, the graph of FIG. 3 expresses the general characteristics of constraining the limit cycle within a set limit so as to meet specific system specifications and requirements.

When the power amplifier's 20 power amplifier control gain cannot be constrained to be within a set limit, for example as discussed above with the limit in FIG. 3, then a nonlinearity is intentionally introduced into the system 10 loop via nonlinearity means or limit cycle suppressor 16. The nonlinearity introduced to the system 10 is chosen to have a code dependent effective gain that is the inverse of the code dependent small signal effective gain of DAC 20. As a result, the gains effectively and preferably neutralise or cancel each other resulting in a constant or code independent combined or composite gain, which is lower than the ultimate gain overall input code deviations.

One example of a nonlinearity that is intentionally introduced into the system is an error deadzone $e_N(n)$. The nonlinearity may be set at a predetermined value, or, as in this embodiment may be made programmable to change in view of conditions in the system 10, as shown by program input signal 63. For example, to neutralize the small gain effect only for small changes, for example in the range of 1 lsb or smaller in the DAC input code, the nonlinearity error deadzone of, for example, 1 lsb may be introduced which should in many applications like this suppress most limit cycles. In one example, if DAC 20 is 10 lsb and controller word resolution is 22 lsb, then the 13 or lower lsb of the controller word are changing then small code changes are observed. However, a programmable range of, for example but not limited to, substantially $1 <=\delta<=4$ provides additional protection from unusual limit cycles. Of course, there are any number of nonlinearaties that can be used. The choice of nonlinearity introduced into the system 10 is based on the specific application and specific requirements the system is designed to meet, such that the range of nonlinearities may vary from the ranges given above for a specific application. Thus, any type of nonlinearity may be used so long as the nonlinearity has an effective gain which is the inverse of the source of the limit cycle's, for example in this embodiment DAC 20, small signal effective gain.

Figure 4:
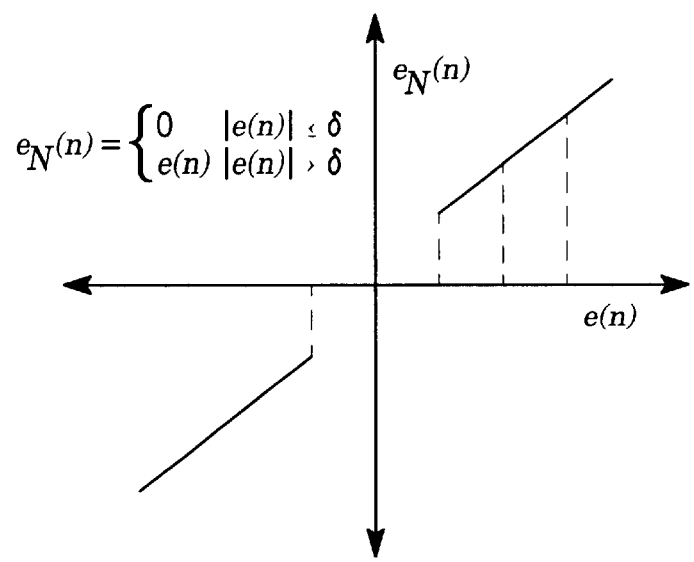
FIG. 4 shows a graph of an error deadzone nonlinearity according to an embodiment of the invention.

FIG. 4 shows a graph of an error deadzone nonlinearity for this embodiment. This is the input/output characteristic for the error deadzone, where the x-axis is the input error and the y-axis is the deadzone output. When the magnitude of the error is less then the deadzone width $\delta$. the output is zero (i.e. dead). Otherwise the output equals the error.

Figure 5:
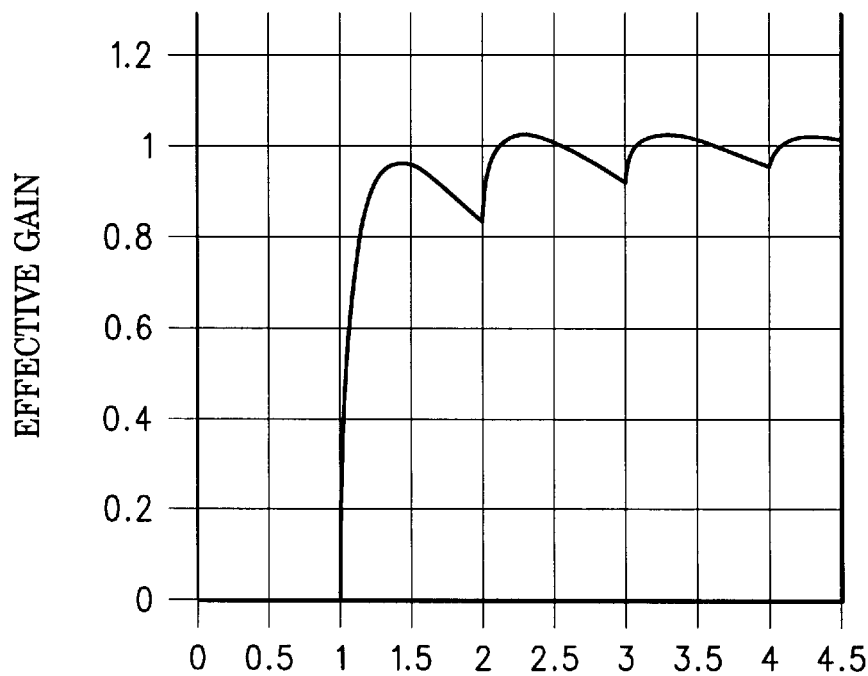
FIG. 5 shows a graph of a response of the effective gain of the error deadzone and digital to analog converter over the input deviation of the error in least significant bits according to an embodiment of the invention.

With reference to FIG. 5, the graph depicts the effective gain for deadzone nonlinearity combined with the DAC 20 nonlinearity, where the deadzone was applied, for example, to the controller error signal e(n) 42 and spanned 1 lsb. Although the nonlinearity error deadzone is introduced prior to the controller 18 to the error signal 42, other types of nonlinearities may be introduced elsewhere in the loop and still solve the problem associated with suppressing limit cycles in the system. The essential feature of the plot of FIG. 5 shows that the combined or composite gain diminishes as the input code changes tend to zero. Consequently, as the loop settles and the controller code changes tend to zero, the combined gain also tends to zero and hence allows the system loop to settle into a DC steady state. It is also shown in FIG. 5 that the composite gain reduces to zero as the code deviations diminish below zero, which shows that the limit cycle is suppressed. In general, it will be appreciated that it is only necessary that the composite gain be reduced below the ultimate gain and not necessarily to zero. In practice, though, for the sake of simplicity it is much easier to reduce the gain to zero. With reference to FIG. 2 and FIG. 5, it can be shown the difference in gain for deviations below 1 lsb. For example, in FIG. 2 the gain tends to infinity while in FIG. 5 the gain tends to zero. Additionally, in FIG. 5 the large signal gain, for example code deviations much larger than 1 lsb, remains unchanged i.e. tends to unity.

It will be appreciated that although the particular embodiments of the invention have been described above, various other modifications and improvements may be made by a person skilled in the art without departing from the scope of the present invention.

What is claimed is:

1. An apparatus for controlling an output of a digital system comprising:

a limit cycle source element for receiving an input signal of the digital system and introducing a first nonlinearity into the system with an error signal having a first effective gain, and a limit cycle suppressor for introducing a second nonlinearity into the system with limit suppressor signal, said second nonlinearity having a second effective gain which is the inverse of the first effective gain to provide an output signal having a composite gain within a predetermined range, wherein the second nonlinearity is selected from within a predetermined range selected from a range of the inverse gain of the first effective gain.

2. An apparatus as claimed in claim 1, wherein the digital system further comprises a power amplifier having an input signal and output signal, wherein the output signal of the power amplifier has the composite gain within the predetermined range.

3. An apparatus as claimed in claim 1, wherein the composite gain is substantially zero.

4. An apparatus as claimed in claim 1, wherein the limit cycle source element is a digital to analog converter.

5. An apparatus as claimed in claim 1, wherein the digital system is a digital closed loop.

6. An apparatus as claimed in claim 1 wherein the second nonlinearity is an error deadzone.

7. A method for controlling an output of a digital system comprising the steps of:

receiving an input signal of the digital system at a limit cycle source element introducing a first nonlinearity into the system with an error signal having a first effective gain; and introducing a second nonlinearity into the system from a limit cycle suppressor with limit suppressor signal, said second nonlinearity having a second effective gain which is the inverse of the first effective gain to provide an output signal having a composite gain within a predetermined range, wherein the second nonlinearity is selected from within a predetermined range dependant from a range of the inverse gain of the first effective gain.

8. A method as claimed in claim 6, wherein the digital system further comprises a step of controlling an output signal of a power amplifier in the digital system having an input signal and output signal, wherein the output signal of the power amplifier has the composite gain within the predetermined range.

* * * * *